United States Patent
Hsin et al.

(10) Patent No.: US 9,641,200 B2
(45) Date of Patent: May 2, 2017

(54) SIGNAL TRANSCEIVER CIRCUIT

(71) Applicant: Wistron NeWeb Corp., Hsinchu (TW)

(72) Inventors: Chiung-Wen Hsin, Hsinchu (TW); Szu-Yuan Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 14/881,713

(22) Filed: Oct. 13, 2015

(65) Prior Publication Data

US 2016/0204819 A1 Jul. 14, 2016

(30) Foreign Application Priority Data

Jan. 12, 2015 (TW) .............................. 104100905 A

(51) Int. Cl.
*H04B 1/40* (2015.01)
*H04B 1/00* (2006.01)

(52) U.S. Cl.
CPC .................................. *H04B 1/0057* (2013.01)

(58) Field of Classification Search
CPC ....................................................... H04B 1/40
USPC ......................................................... 455/84
See application file for complete search history.

(56) References Cited

U.S. PATENT DOCUMENTS

| | | | | |
|---|---|---|---|---|
| 3,737,799 A | * | 6/1973 | Stander | G01S 13/53 330/126 |
| 2004/0014435 A1 | * | 1/2004 | Woo | H04B 1/406 455/103 |
| 2007/0263754 A1 | * | 11/2007 | Currivan | H04B 1/0003 375/349 |

* cited by examiner

*Primary Examiner* — Wesley Kim
*Assistant Examiner* — Raj Chakraborty
(74) *Attorney, Agent, or Firm* — Muncy, Geissler, Olds & Lowe, P.C.

(57) ABSTRACT

The present invention provides a signal transceiver circuit including a band-stop filter, a first band-pass filter, and a second band-pass filter. The band-stop filter blocks signals between a first frequency and a second frequency for letting signals outside of the first frequency and the second frequency of the first multi-channel signal and the second multi-channel signal pass. The first band-pass filter blocks signals output by the band-stop filter outside of a third frequency and a fourth frequency for letting signals output by the band-stop filter between the third frequency and the fourth frequency pass. The second band-pass filter blocks signals outside of a fifth frequency and a sixth frequency of the first multi-channel signal and the second multi-channel signal for letting signals between the fifth frequency and the sixth frequency of the first multi-channel signal and the second multi-channel signal pass.

6 Claims, 5 Drawing Sheets

SIGNAL TRANSCEIVER CIRCUIT

CROSS REFERENCE TO RELATED APPLICATIONS

This application claims priority of Taiwan Patent Application No. 104100905, filed on Jan. 12, 2015, the entirety of which is incorporated by reference herein.

BACKGROUND OF THE INVENTION

Field of the Invention

The present invention relates to a signal transceiver circuit, and in particular to a signal transceiver circuit capable of processing multi-channel signals.

Description of the Related Art

Presently, mobile devices are highly developed and multi-functional. For example, handheld devices such as mobile phones and tablets are capable of conducting telecommunications, receiving and transmitting e-mails, maintaining social networks, managing contacts, and playing media. Hence, users can implement various applications on their mobile devices, such as a simple phone call, social network interaction, or commercial transaction.

FIG. 1 is a schematic diagram illustrating a conventional prior art signal transceiver circuit. The signal transceiver circuit 100 includes a signal transceiver terminal 102, a choke circuit 104, a band-pass filter 106, a choke circuit 108, a choke circuit 110, a band-pass filter 112, a choke circuit 116, a band-pass filter 118 and a switching device 114, wherein the choke circuit is constituted by inductors and capacitors. The signal transceiver terminal 100 is arranged to receive and transmit a first multi-channel signal SM1 or a second multi-channel signal SM2 from another signal transceiver terminal (figure not shown). It should be noted that the first multi-channel signal SM1 includes a first signal S1 and a second signal S2, and the second multi-channel signal SM2 includes a first signal S1 and a third signal S3, wherein the first signal S1, the second signal S2 and the third signal S3, and the first signal S1, the second signal S2 and the third signal S3 have different frequency bands from each other. The signal transceiver circuit 100 is arranged to split the first signal S1 and the second signal S2 of the first multi-channel signal SM1 and split the first signal S1 and the third signal S3 of second multi-channel signal SM2 by the choke circuit 104, the band-pass filter 106, the choke circuit 108, the choke circuit 110, the band-pass filter 112, the choke circuit 116 and the band-pass filter 118. Moreover, the switching device 114 is selectively coupled to the band-pass filter 106 or the band-pass filter 112 according to the type of the received multi-channel signal for transmitting signals to a specific pin. For example, when the signal transceiver terminal 102 receives the first multi-channel signal SM1, the switching device 114 is coupled to the band-pass filter 112 to transmit and receive the split second signal S2. When the signal transceiver terminal 102 receives the second multi-channel signal SM2, the switching device 114 is coupled to the band-pass filter 106 to transmit and receive the split third signal S3. Moreover, the specific pin can belong to a controller, a signal processor or a signal processing circuit and the specific pin is arranged to transmit and receive the second signal S2 and the third signal S3.

More specifically, the frequency band of the first signal S1 is between the frequency band of the second signal S2 and the frequency band of the third signal S3, and the frequency band of the third signal S3 is higher than the frequency band of the second signal S2, as shown in FIG. 2. The choke circuit 104 is arranged to block signals lower than the frequency band of the second signal S2 and the frequency band of the first signal S1, only the signals having frequencies higher than the frequency band of the third signal S3 are allowed to pass. The band-pass filter 106 only lets signals on the frequency band of the third signal S3 pass. The choke circuit 108 is arranged to block the frequency band of the third signal S3 and signals having frequencies higher than the frequency band of the third signal S3, only the signals on the frequency bands of the first signal S1 and the second signal S2 and signals lower than the frequency band of the first signal S1 and the second signal S2 are allowed to pass. The choke circuit 110 is arranged to block the frequency band of the first signal S1 and signals having frequencies higher than the frequency band of the first signal S1, only the signals on the frequency band of the second signal S2 and the signals lower than the frequency band of the second signal S2 are allowed to pass. The band-pass filter 112 only let signals on the frequency band of the second signal S2 pass. The choke circuit 116 is arranged to block the frequency band of the second signal S2 and signals lower than the frequency band of the second signal S2, only the signals on the frequency band of the first signal S1 and signals higher than the frequency band of the first signal S1 are allowed to pass. The band-pass filter 118 only lets signals on the frequency band of the first signal S1 pass. As described above, the choke circuit 104, the band-pass filter 106, the choke circuit 108, the choke circuit 110, the band-pass filter 112, the choke circuit 116 and the band-pass filter 118 can split the first signal S1 and the second signal S2 from the first multi-channel signal SM1, and split the first signal S1 and the third signal S3 from the second multi-channel signal SM2.

More particularly, the first signal S1 is compatible with a Local Area Network (LAN), such that the frequency band of the first signal S1 is 1125~1225 MHz. The second signal S2 is compatible with Multimedia over Coax Alliance 1.1 of Wide Area Network (WAN), such that the frequency band of the second signal S2 is 975~1025 MHz. The third signal S3 is compatible with Multimedia over Coax Alliance 2.0, such that the frequency band of the third signal S3 is 1350~1675 MHz.

As described above, the signal transceiver circuit 100 can receive and transmit two multi-channel signals SM1/SM2, and split the first signal S2, the second signal S2 and the third signal S3 from the two multi-channel signals SM1/SM2 by four choke circuits 104, 108, 110 and 116 and three band-pass filters 106, 112 and 118.

The cost as well as the entire volume of the signal transceiver circuit 100 depends on the number of the components used. Moreover, because the output terminal is implemented on the end terminal of the switching device 114, where the end terminal can only be coupled to one of the second signal S2 and the third signal S3 at once, the three signals cannot be detected or received at the same time. It should be noted that the signal blocking function of the band-pass filter is achieved by blocking the unwanted signals via short circuit impedance or open circuit impedance. The short circuit impedance or the open circuit impedance can cause the signals with unneeded frequency to flow to the ground through the short circuit or to be blocked by the open circuit, such that signals with unneeded frequency are filtered out. As described above, when the three band-pass filters are arranged in parallel connection without any choke circuit implemented, and when signal rejection of one of the three band-pass filters of the signal transceiver circuit is achieved via short circuit impedance, the signals passing through the other two band-pass filters will be lost or attenuated effected by short circuit impedance. Therefore, the signal rejections of the three band-pass filters is preferable to be achieved via open circuit impedance, such that the signals passing through the other band-pass filters will not be lost or attenuated. In order to reach open circuit impedance, the signal transceiver circuit 100 of FIG. 1 must have choke circuits implemented in front of the band-pass filters 106, 112, 118.

Nevertheless, with the advance of technology, the volume and the component costs of electronic devices are of great importance. Based on a purpose of volume reduction, how to decrease the number of interfaces yet retain a set amount of functions in an electronic device has become a problem that needs to be solved. Aside from this, how to use fewer amount of electronic components to complete the circuit having the same function has become the major problem that the industry must face in order to reduce the volume as well as the overall cost.

BRIEF SUMMARY OF THE INVENTION

A detailed description is given in the following embodiments with reference to the accompanying drawings.

An exemplary embodiment provides a signal transceiver circuit. The signal transceiver circuit includes a signal transceiver terminal, a band-stop filter, a first band-pass filter, and a second band-pass filter. The signal transceiver terminal is arranged to receive one of a first multi-channel signal and a second multi-channel signal, and transmit the received first multi-channel signal and the received second multi-channel signal to a first node. The band-stop filter has an output terminal and an input terminal coupled to the first node, the band-stop filter and is arranged to block signals between a first frequency and a second frequency of the first multi-channel signal and the second multi-channel signal for passing signals outside of the first frequency and the second frequency of the first multi-channel signal and the second multi-channel signal. The first band-pass filter has an output terminal and an input terminal coupled to the output terminal of the band-stop filter, and the first band-pass filter is arranged to block signals output by the band-stop filter outside of a third frequency and a fourth frequency for letting signals output by the band-stop filter between the third frequency and the fourth frequency pass. The second band-pass filter has an output terminal and an input terminal coupled to the first node, and the second band-pass filter is arranged to stop signals outside of a fifth frequency and a sixth frequency of the first multi-channel signal and the second multi-channel signal for letting signals between the fifth frequency and the sixth frequency of the first multi-channel signal and the second multi-channel signal pass.

Another exemplary embodiment provides a signal transceiver circuit. The signal transceiver circuit includes a signal transceiver terminal, a band-stop filter, a first band-pass filter, and a second band-pass filter. The signal transceiver terminal is arranged to receive and transmit one of a first multi-channel signal and a second multi-channel signal, and transmit the received first multi-channel signal and the second multi-channel signal to a first node, wherein the first multi-channel signal comprises a multi-channel signal comprising a first signal and a third signal. The band-stop filter has an output terminal and an input terminal coupled to the first node, and the band-stop filter is arranged to block the first signal for letting the second signal and the third signal pass. The first band-pass filter has an output terminal and an input terminal coupled to the output terminal of the band-stop filter, and the first band-pass filter is arranged to block the signal output by the band-stop filter except for the first signal, the second signal and the third signal for letting the second signal and the third signal. The second band-pass filter has an output terminal and an input terminal coupled to the first node, and the second band-pass filter is arranged to block signals except for the first signal for letting the first signal pass.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
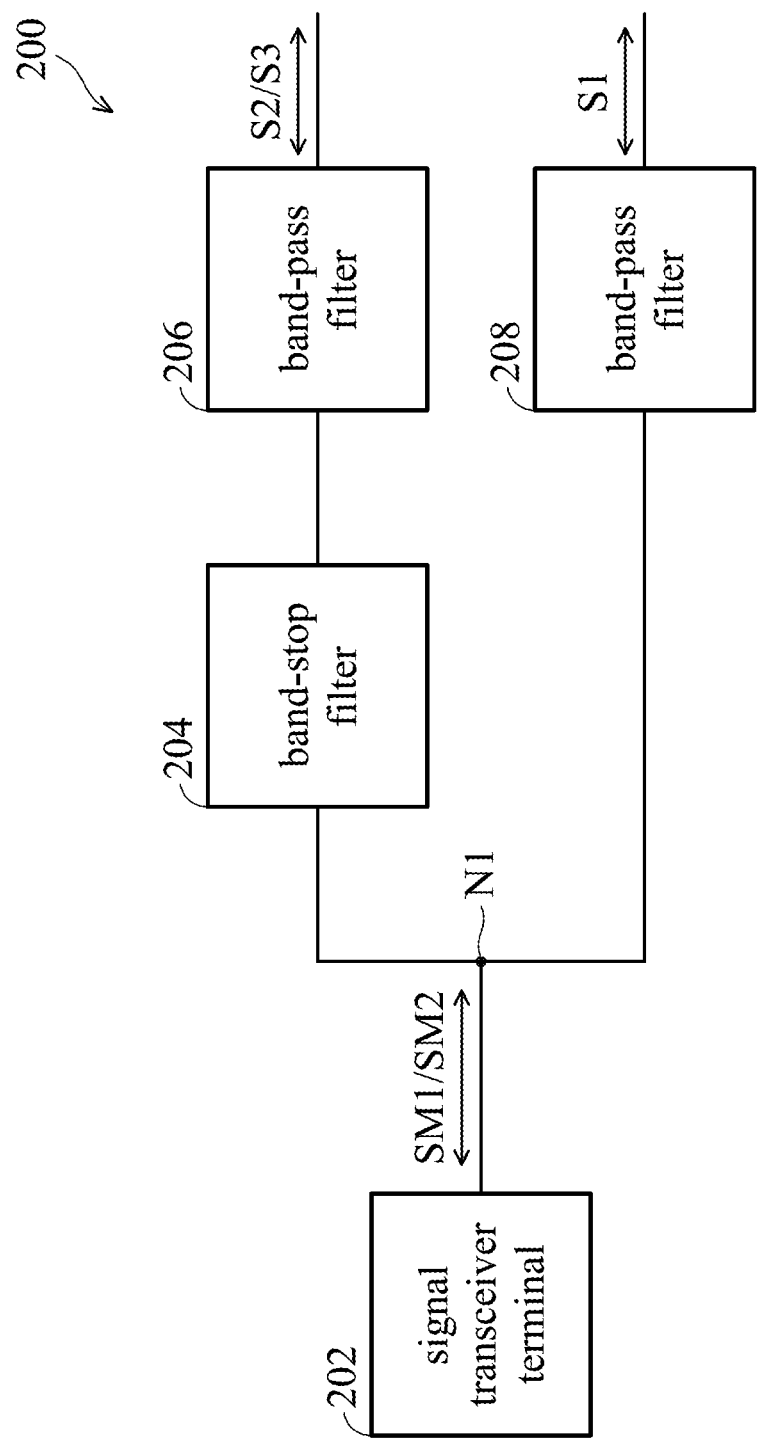
FIG. 3 is a schematic diagram illustrating an embodiment of the signal transceiver circuit of the present disclosure.

FIG. 3 is a schematic diagram illustrating an embodiment of the signal transceiver circuit of the present disclosure. The signal transceiver circuit 200 includes a signal transceiver terminal 202, a band-stop filter 204 (band-rejection filter), a band-pass filter 206 and a band-pass filter 208. The signal transceiver terminal 202 is arranged to receive and transmit the first multi-channel signal SM1 and the second multi-channel signal SM2, and to transmit the received first multi-channel signal SM1 and the received second multi-channel signal SM2 to a first node N1. The band-stop filter 204 has an input terminal and an output terminal, where the input terminal is coupled to the first node N1. The band-stop filter 204 is arranged to block signals between a first frequency and a second frequency of the first multi-channel signal SM1 and the second multi-channel signal SM2, only signals outside of the first frequency and the second frequency of the first multi-channel signal SM1 and the second multi-channel signal SM2 are allowed to pass. The band-pass filter 206 has an input terminal and an output terminal, where the input terminal is coupled to the output terminal of the band-stop filter 204. The band-pass filter 206 is arranged to block signals output by the band-stop filter 204 outside of a third frequency and a fourth frequency, only signals between the third frequency and the fourth frequency of the first multi-channel signal SM1 and the second multi-channel signal SM2 are allowed to pass. The band-pass filter 208 has an input terminal and an output terminal, where the input terminal is coupled to the first node N1. The band-pass filter 208 is arranged to block signals outside of the fifth frequency and a sixth frequency of the first multi-channel signal SM1 and the second multi-channel signal SM2, only the signals between the fifth frequency and the sixth frequency of the first multi-channel signal SM1 and the second multi-channel signal SM2 are allowed to pass.

It should be noted that, in the design of the signal transceiver circuit provided by the present invention, the first frequency is equal to the fifth frequency, and the second frequency is equal to the sixth frequency. Moreover, the second frequency is higher than the first frequency, the third frequency is lower than the fourth frequency, the first frequency is higher than the third frequency, and the second frequency is lower than the fourth frequency.

Figure 4:
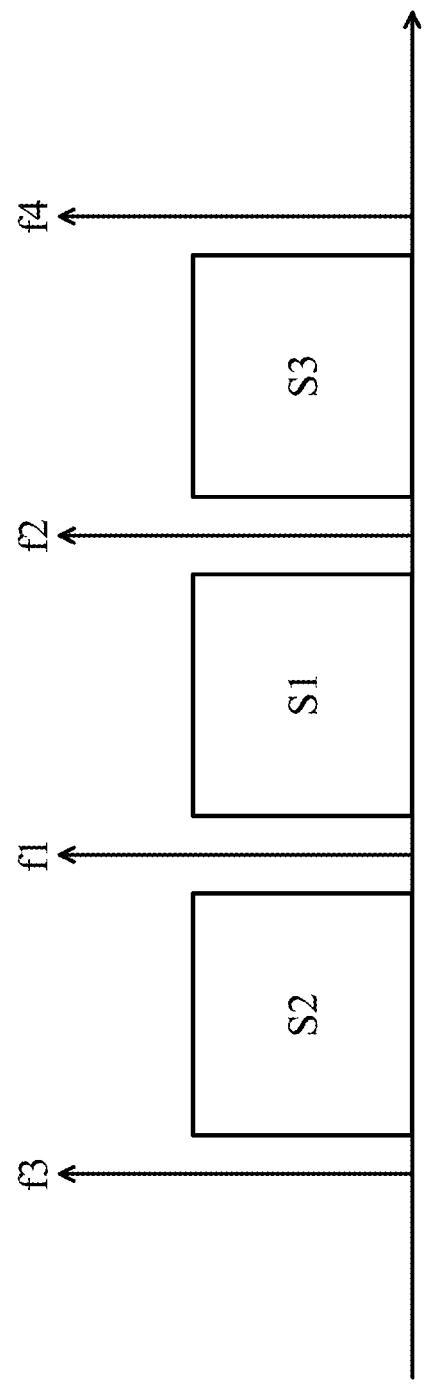
FIG. 4 is a schematic diagram illustrating an embodiment of the frequency band of signals of the present disclosure.

More specifically, as shown in FIG. 4, the frequency band of the first signal S1 is between the first frequency f1 and the second frequency f2, the frequency band of the second signal S2 is between the first frequency f1 and the third frequency f3, and the frequency band of the third signal S3 is between the second frequency f2 and the fourth frequency f4. Therefore, the band-stop filter 204 blocks the first signal S1 with the frequency band between the first frequency f1 and the second frequency f2, and only lets the first frequency f1 and the second frequency f2 with frequency band outside of the first frequency f1 and the second frequency f2 pass. The band-pass filter 206 blocks signals outside of a third frequency f3 and a fourth frequency f4 for outputting the second signal S2 with the frequency band between the third frequency f3 and the first frequency f1 and the third signal S3 with the frequency band between the second frequency f2 and the fourth frequency f4.

For example, the first signal S1 can be compatible with a Local Area Network (LAN), and the frequency band of the first signal S1 is 1125~1225 MHz. The second signal S2 can be compatible with Multimedia over Coax Alliance 1.1 of Wide Area Network (WAN), and the second signal S2 is 975~1025 MHz. The third signal S3 is compatible with Multimedia over Coax Alliance 2.0, and the third signal S3 is 1350~1675 MHz. More particularly, in this embodiment, the first frequency can be 1125 MHz, the second frequency can be 1225 MHz, the third frequency can be 975 MHz and the fourth frequency can be 1675 MHz.

Figure 1:
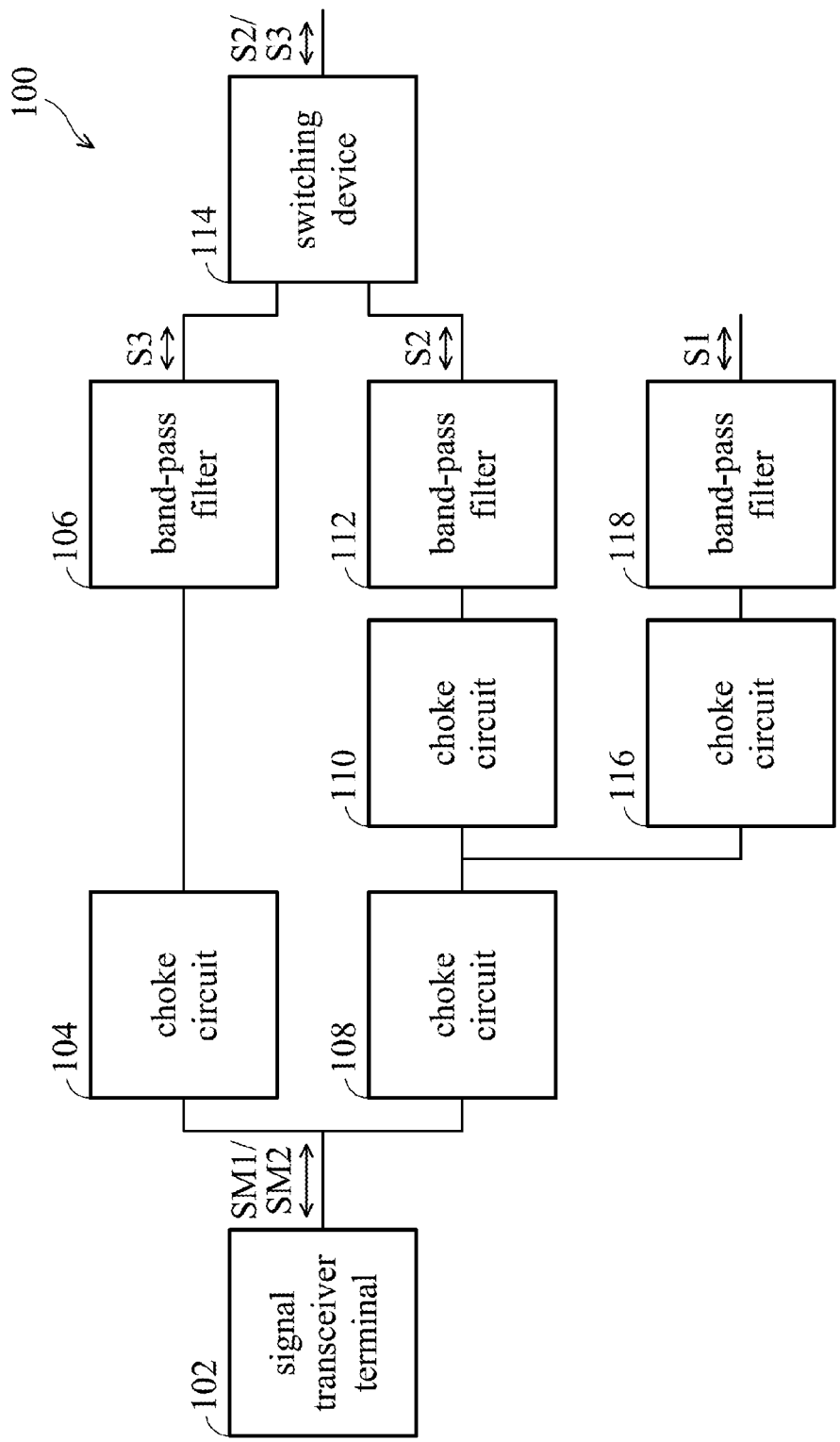
FIG. 1 is a schematic diagram illustrating a conventional prior art signal transceiver circuit.
Figure 2:
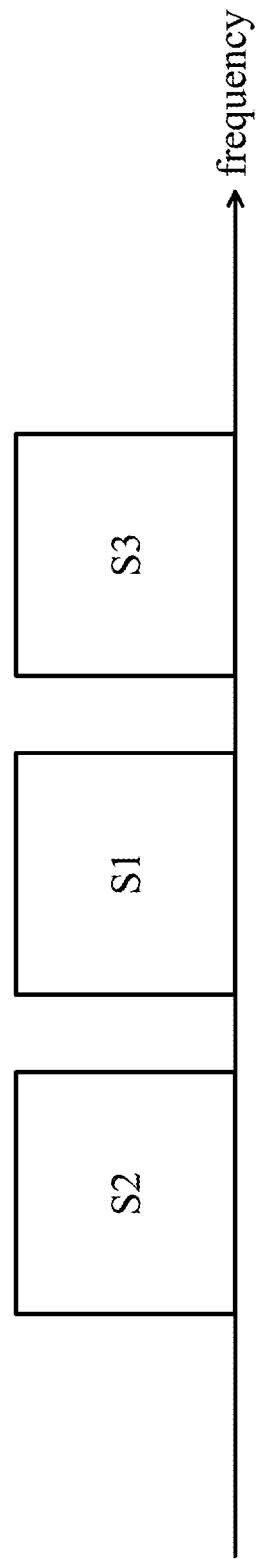
FIG. 2 is a schematic diagram exemplifying conventional prior art frequency band of signals used in FIG. 1.

As described above, the signal transceiver circuit 200 can split the first signal S1 and the second signal S2 from the first multi-channel signal SM1 and split the first signal S1 and the third signal S3 from the second multi-channel signal by one band-stop filter 204 and two band-pass filters 206 and 208. Moreover, the switching device 114 of FIG. 1 is not needed in the signal transceiver circuit 200. The band-stop filter 204 may implement the rejection of the first signal S1 on an open circuit impendence, such that the signal transceiver circuit 200 can isolate signals without lowering the working efficiency, such as signal loss or being inhibited, without implementing the choke circuits of FIG. 1.

Figure 5:
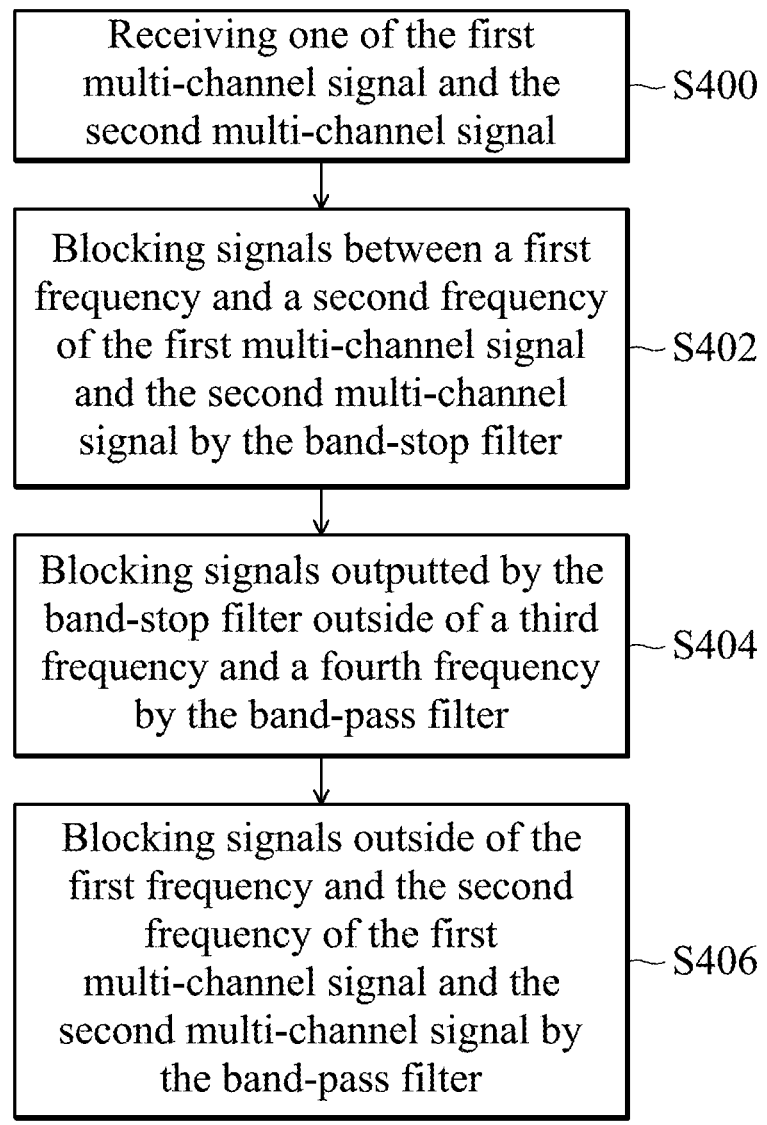
FIG. 5 is a flowchart of a signal receiving and transmitting method according to an embodiment of the present disclosure.

FIG. 5 is a flowchart of a signal receiving and transmitting method according to an embodiment of the present disclosure. The signal receiving and transmitting method is applied to the transceiver circuit 200 of FIG. 3. The process starts at step S400.

In step S400, the transceiver circuit 200 receives either the first multi-channel signal SM1 or the second multi-channel signal SM2 by the signal transceiver terminal 202, and transmits the received first multi-channel signal SM1 or second multi-channel signal SM2 to a first node N1.

Next, in step S402, the transceiver circuit 200 blocks signals between a first frequency and a second frequency of the first multi-channel signal SM1 and the second multi-channel signal SM2 by the band-stop filter 204, only the signals outside of a first frequency and a second frequency of the first multi-channel signal SM1 and the second multi-channel signal SM2 are allowed to pass.

Next, in step S404, the transceiver circuit 200 blocks signals output by the band-stop filter 204 outside of a third frequency and a fourth frequency by the band-pass filter 206, only the signals output by the band-stop filter 204 between the third frequency and the fourth frequency are allowed to pass, thereby outputting the second signal S2 or the third signal S3.

Next, in step S406, the transceiver circuit 200 blocks signals outside of the first frequency and the second frequency of the first multi-channel signal SM1 and the second multi-channel signal SM2 by the band-pass filter 208, only the signals between the frequency band and the first frequency of the first multi-channel signal SM1 and the second multi-channel signal SM2 are allowed to pass.

As described above, the transceiver circuit can isolate (filter) signals with multiple channels without use of any choke circuits.

Resource assignment methods, data transmission methods, or certain aspects or portions, may be in a form of program codes (i.e., executable instructions) stored in tangible media, such as floppy diskettes, CD-ROMS, hard drives, or any other machine-readable storage medium. The program codes can also be transmitted over transmission media through wire, cable, fiber optics, or via any other form of transmission. The program codes are applicable to be cooperating with a processor and together being applied to specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal transceiver circuit, comprising:
    a signal transceiver terminal, arranged to receive one of a first multi-channel signal and a second multi-channel signal, and to transmit the received first multi-channel signal and the received second multi-channel signal to a first node;
    a band-stop filter, having an output terminal and an input terminal coupled to the first node, and arranged to block the one of the first multi-channel signal and the second multi-channel signal between a first frequency and a second frequency for letting signals outside of the first frequency and the second frequency of the one of the first multi-channel signal and the second multi-channel signal pass;
    a first band-pass filter, having an output terminal and an input terminal coupled to the output terminal of the band-stop filter, and arranged to block signals output from the band-stop filter outside of a third frequency and a fourth frequency for letting signals output by the band-stop filter between the third frequency and the fourth frequency pass; and
    a second band-pass filter, having an output terminal and an input terminal coupled to the first node, and arranged to block the one of the first multi-channel signal and the second multi-channel signal outside of a fifth frequency and a sixth frequency for letting signals between the fifth frequency and the sixth frequency of the one of the first multi-channel signal and the second multi-channel signal pass;

wherein the frequency band of a first signal of the first multi-channel signal and the second multi-channel signal is between the first frequency and the second frequency, the frequency band of a second signal of the first multi-channel signal is between the first frequency and the third frequency, and the frequency band of a third signal of the second multi-channel signal is between the second frequency and the fourth frequency, wherein the first multi-channel signal comprises the first signal and the second signal, the second multi-channel signal comprises the first signal and the third signal, the second frequency is higher than the first frequency, the fourth frequency is higher than the third frequency, the first frequency is higher than the third frequency, and the second frequency is lower than the fourth frequency.

2. The signal transceiver circuit as claimed in claim 1, wherein the first frequency is equal to the fifth frequency, and the second frequency is equal to the sixth frequency.

3. A signal transceiver circuit, comprising:
a signal transceiver terminal, arranged to receive and transmit one of a first multi-channel signal and a second multi-channel signal, and to transmit the received first multi-channel signal and the second multi-channel signal to a first node, wherein the first multi-channel signal comprises a first signal and a second signal, and the second multi-channel signal comprises the first signal and a third signal;
a band-stop filter, having an output terminal and an input terminal coupled to the first node, and arranged to block the first signal for letting the second signal and the third signal pass;
a first band-pass filter, having an output terminal and an input terminal coupled to the output terminal of the band-stop filter, and arranged to block the signal output from the band-stop filter other than the second signal and the third signal for letting the second signal and the third signal pass through the first band-pass filter; and
a second band-pass filter, having an output terminal and an input terminal coupled to the first node, and arranged to block signals other than the first signal for letting the first signal pass through the second band-pass filter.

4. The signal transceiver circuit as claimed in claim 3, wherein the frequency band of the first signal is between a first frequency and a second frequency, the frequency band of the second signal is between the first frequency and a third frequency, and the frequency band of the third signal is between the second frequency and a fourth frequency.

5. The signal transceiver circuit as claimed in claim 3, wherein the second frequency is higher than the first frequency, the fourth frequency is higher than the third frequency, the first frequency is higher than the third frequency, and the second frequency is lower than the fourth frequency.

6. The signal transceiver circuit as claimed in claim 3, wherein the first signal is compatible with a Local Area Network (LAN), the second signal is compatible with Multimedia over Coax Alliance 1.1 of Wide Area Network (WAN), and the third signal is compatible of Multimedia over Coax Alliance 2.0.

* * * * *